(12) United States Patent
Jain et al.

(10) Patent No.: US 10,516,649 B1
(45) Date of Patent: Dec. 24, 2019

(54) HIGH-PERFORMANCE COMPUTER SECURITY GATEWAY FOR CLOUD COMPUTING PLATFORM

(71) Applicant: Valtix, Inc., Milpitas, CA (US)

(72) Inventors: Vishal Jain, San Jose, CA (US); Vijay Chander, San Ramon, CA (US); Praveen Patnala, Santa Clara, CA (US)

(73) Assignee: VALTIX, INC., Santa Clara, CA (US)

( * ) Notice: Subject to any disclaimer, the term of this patent is extended or adjusted under 35 U.S.C. 154(b) by 0 days.

(21) Appl. No.: 16/019,539

(22) Filed: Jun. 27, 2018

(51) Int. Cl.
*H04L 29/06* (2006.01)
*H04L 29/08* (2006.01)

(52) U.S. Cl.
CPC ...... *H04L 63/0245* (2013.01); *H04L 63/1416* (2013.01); *H04L 63/1425* (2013.01); *H04L 63/168* (2013.01); *H04L 63/20* (2013.01); *H04L 65/102* (2013.01); *H04L 67/10* (2013.01); *H04L 67/02* (2013.01)

(58) Field of Classification Search
CPC ............. H04L 63/0245; H04L 63/0254; H04L 63/0227; H04L 63/0209; H04L 63/0281; H04L 63/1416; H04L 63/1408; H04L 63/166; H04L 63/168
See application file for complete search history.

(56) References Cited

U.S. PATENT DOCUMENTS

| | | | | |
|---|---|---|---|---|
| 7,203,740 B1* | 4/2007 | Putzolu | ................... | H04L 29/06 709/217 |
| 7,490,350 B1* | 2/2009 | Murotake | ............... | G06F 21/85 726/11 |
| 7,774,591 B2* | 8/2010 | Kamiya | .............. | G06F 15/7867 713/1 |
| 8,307,418 B2* | 11/2012 | Devdhar | ............. | H04L 63/0236 370/235 |
| 8,826,414 B2* | 9/2014 | Yoo | ......................... | G06F 21/55 713/188 |
| 9,910,705 B1* | 3/2018 | Mak | ......................... | G06F 21/57 |
| 10,171,423 B1* | 1/2019 | Woodberg | ........... | H04L 63/0254 |

* cited by examiner

*Primary Examiner* — Zachary A. Davis
(74) *Attorney, Agent, or Firm* — Hickman Palermo Becker Bingham LLP

(57) ABSTRACT

One or more integrated circuits for implementing a network firewall for a cloud computing platform are disclosed. The one or more integrated circuits comprise: special-purpose hardware, configured to perform: receiving an item in a transport layer from a second hardware portion through a communication bus, the item being derived from original data received by the second hardware portion from a source computer device; and applying processing in increasingly higher communication layers to the item to obtain processed data in an application layer. The applying comprises identifying a payload in the item; determining whether the item includes a security attack based on the payload, the original data, and additional data received from the source computer device before or after the original data was received; and transmitting the processed data, including a result of the determining, to the second hardware portion.

16 Claims, 6 Drawing Sheets

302 Receive, by a first hardware portion, an item in a transport layer from a second hardware portion through a communication bus, the item being derived from original data received by the second hardware portion from a source computer device 304 Apply, by the first hardware portion, processing in increasingly higher communication layers to the item to obtain processed data in an application layer 306 Identify a payload in the item 308 Determine whether the item includes a security threat based on the payload, the original data, and additional data received from the source computer device before or after the original data was received 310 Transmit the processed data, including a result of the determining, to the second hardware portion

HIGH-PERFORMANCE COMPUTER SECURITY GATEWAY FOR CLOUD COMPUTING PLATFORM

FIELD OF THE DISCLOSURE

The present disclosure relates to the technical area of computer network security. The present disclosure specifically relates to high-performance computer network firewalls with deep content inspection.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Today, enterprise computer systems are often built on cloud computing platforms. To protect workloads running on such a cloud computing platform against infiltration and data exfiltration attacks, various security solutions that perform deep content inspection of network traffic streams are applied. Until recently, most public cloud computing platforms are implemented using general-purpose processors (a processor that is not tied to or integrated with a particular language or piece of software), such as Intel 8086 (x86) processors. Now, more public computing platforms are incorporating higher-performance hardware components, such as field-programmable gate arrays (FPGAs) or graphics processing units (GPUs). It would be helpful to take better advantage of such higher-performance implementation to offer stronger security solutions for cloud computing platforms or other similar networked systems.

DETAILED DESCRIPTION

Figure 1:
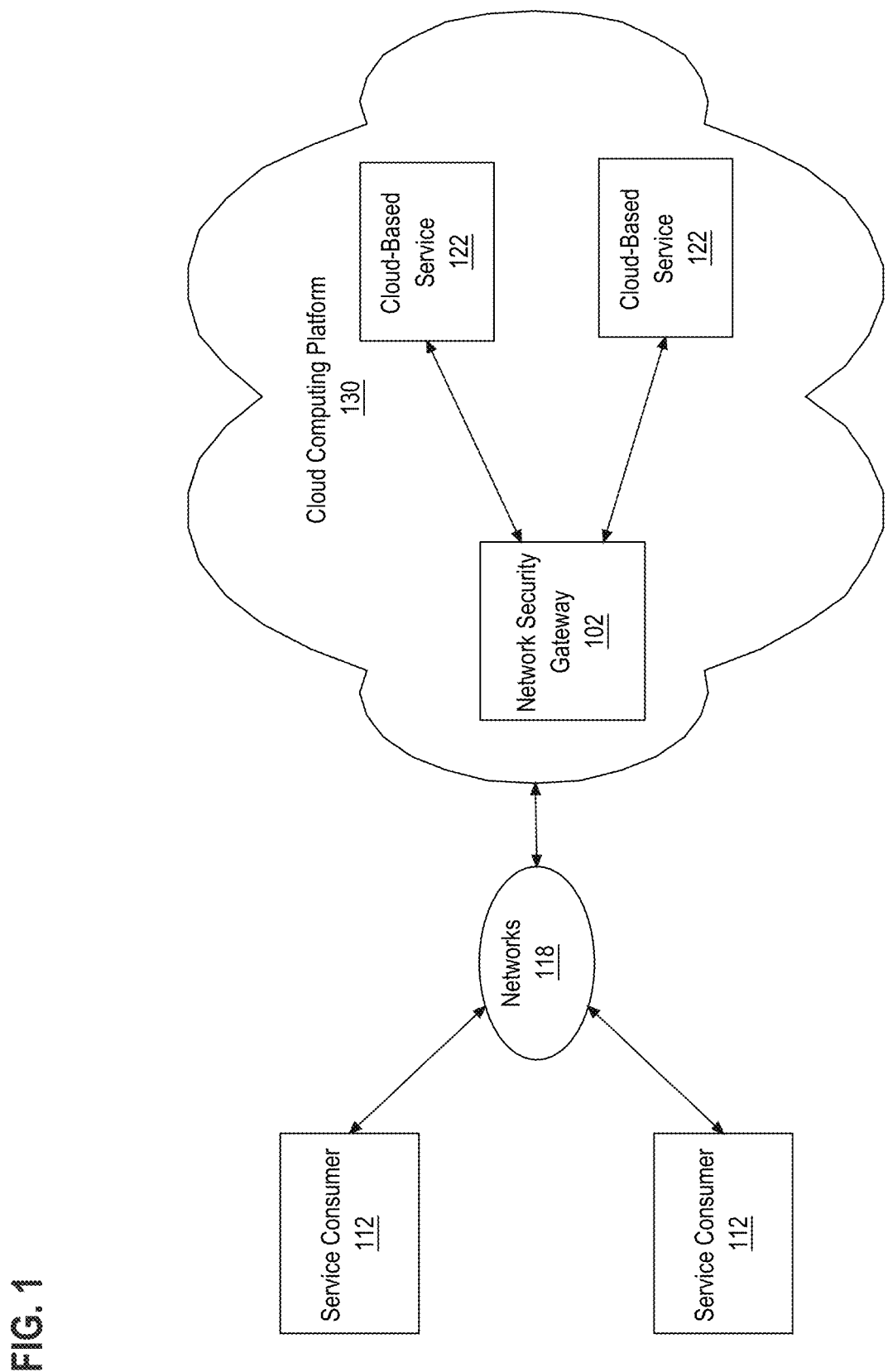
FIG. 1 illustrates an example computing environment with which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline:
1. GENERAL OVERVIEW
2. EXAMPLE COMPUTING ENVIRONMENTS
3. EXAMPLE COMPUTER CONFIGURATIONS AND DATA PATHS
   3.1. OFFLOADING PROCESSING TO HIGHER-PERFORMANCE PORTION
   3.2. MANAGING DATA PIPELINE IN HIGHER-PERFORMANCE PORTION
      3.2.1. IMPLEMENTING APPLICATION-LEVEL PROCESSING
      3.2.2. IMPLEMENTING ANOMALY DETECTION
4. EXAMPLE PROCESSES
5. IMPLEMENTATION EXAMPLE—HARDWARE OVERVIEW
6. EXTENSIONS AND ALTERNATIVES

1 General Overview

A security gateway system and related methods are disclosed. In some embodiments, the security gateway system is programmed to provide a network firewall for a cloud computing platform. When a cloud computing platform is implemented with hardware components that are more advanced than general-purpose processors, such as an FPGA, the security gateway system can comprise a higher-performance hardware portion that utilizes such hardware components. The security gateway system can also comprise a lower-performance hardware portion, such as one or more x86 processors, to handle lower-level data processing. In providing a network firewall, the security gateway system is programmed to enable secure communication between any computer device outside the cloud computing platform and any computer system within the cloud computing platform. In certain embodiments, the security gateway system can also be programmed to enable secure communication between two computer devices within the cloud computing platform, to provide finer segmentation across various application traffic. Such enablement can involve many computation-intensive operations, including advanced detection of incoming security threats or critical data exfiltration through deep content inspection, and the security gateway system is configured to perform as much of the computation via the higher-performance hardware portion as possible to achieve an optimal performance.

In some embodiments, upon receiving a packet from a source computer system ultimately destined for a destination computer system, the lower-performance hardware portion of the security gateway system is programmed to handle lower-level data processing. For example, under the Open System Interconnect (OSI) model, after the initial handshake process, the lower-level processing of a packet can include processing up to the transport layer. The processing result is then transmitted to the higher-performance hardware portion of the security gateway system through a communication bus. The higher-performance hardware portion is programmed to then handle higher-level data processing. For example, under the OSI, the higher-level processing can include processing up to the application level. More specifically, the higher-level processing may include data decryption based on symmetric cryptography; data decompression; session management; other application-level processing under a transfer protocol, such as the HTTP/2 protocol; or detection of incoming security threats or critical data exfiltration.

In some embodiments, to detect security attacks, the higher-performance hardware portion is programmed to separate the payload from the metadata in the original packet or the data processed so far and evaluate various attributes of the payload and the metadata. The evaluation can include determining whether the payload includes a user authorization to share confidential data (e.g., the source computer system may have obtained a user's authorization to bill a specific charge to a credit card) or whether the payload matches specific keywords or patterns (e.g., filenames or file content of known viruses). The evaluation can also include determining whether the size of the payload falls in a specific range (e.g., too large or in a range associated with known threats) or whether the packet was sent during a specific period of time (e.g., certain times of the day). The higher-performance hardware portion can also be programmed to keep track of a global or at least a broader communication state for careful evaluation of related packets or connections through which multiple packets are transmitted over time. For example, the communication state can be maintained at the HTTP session level for monitoring inter-session communications, where the sessions may be correlated to computer applications. More specifically, the higher-performance hardware portion can be programmed to determine whether the frequency of communications (packets, a corresponding higher-level item, etc.) transmitted by the source computer system exceeds a certain threshold, whether the present communication is preceded by one or more communications which involve extensive querying of the application programming interfaces (APIs) provided by the destination computer system, or whether the present communication is followed by one or more communications involving transferring of generally confidential data to specific data repositories. For example, the present communication can be an HTTP request associated with one session that is succeeded by another HTTP request associated with another session for transferring data to a certain data repository.

By virtue of the various features described herein, the security gateway system produces many technical benefits. In various embodiments, the security gateway system can be deployed on public or other generic cloud computing platforms without requiring customized hardware often utilized in on-premise data centers. By leveraging advanced, parallel computing features of such cloud computing platforms, the security gateway system can readily provide native, scaled-up firewall capabilities to such cloud computing platforms. In gateway data processing, while current approaches might offload select computations to higher-performance hardware components, the security gateway system is configured to perform most of the higher-level data processing in a higher-performance hardware portion. Such a processing pipeline substantially increases the overall processing speed from not only the inherent parallelism and other high-performance features of the higher-performance hardware portion but also the reduced data transfer (and the associated overhead) between the lower-performance hardware portion and the higher-performance hardware portion. Furthermore, the security gateway system offers advanced, hardware-enabled detection of incoming security threats or critical data exfiltration. In addition to utilizing digital signatures that typically characterize static, single-dimensional data attributes, such as filenames and other keywords, the security gateway system is programmed to characterize various aspects of all the data being communicated through the security gateway system over an extended period of time. In particular, the security gateway system is programmed to evaluate a series of communications between a pair of source and destination computer systems (and a corresponding pair of computer applications) in terms of the nature of and the amount of time required to process the communications as well as the relationships among the communications. Such advanced security attack detection results in stronger protection of the cloud computing platform. In addition, the security gateway is able to manage distributed implementation of some of the rich detection mechanisms via different hardware portions, such as multiple FPGAs and/or other microcode-executing processors. Such scale-out provides elasticity to the security solution.

2 Example Computing Environments

FIG. 1 illustrates an example computing environment with which various embodiments may be practiced. FIG. 1 is shown in simplified, schematic format for purposes of illustrating a clear example and other embodiments may include more, fewer, or different elements.

In some embodiments, the computing environment includes a cloud computing platform 130, which includes one or more cloud-based service computers 122 and a network security gateway computer 102 (security gateway system), and one or more service consumer computers 112, which are communicatively coupled directly or indirectly via one or more networks 118.

In some embodiments, the cloud computing platform 130 comprises a pool of configurable system resources, each of which may include one or more of a general-purpose processor, a special-purpose processor, or programmable hardware. For example, public cloud computing platforms may include x86 processors, FPGAs, or GPUs. The cloud computing platform 130 is typically programmed to provide fundamental computing services and enable rapid deployment of independent, higher-level computing services by one or more enterprises with minimum infrastructure management efforts. The components implementing these higher-level computing services then correspond to the one or more cloud-based service computers 122. These components can run as virtual instances or bare metal (physical) instances. For example, a cloud-based service 122 may be a Web server computer managing a Web service of handling account authentication.

In some embodiments, some of the configurable system resources are allocated to the security gateway system 102. The security gateway system 102 generally includes computers, virtual computing instances or virtual appliances, and/or instances of a server-based application. The security gateway system 102 is configured to generally host or execute functions including but not limited to network firewall capabilities for the cloud computing platform 130. More specifically, the security gateway system 102 is configured to maintain data security not only within the cloud computing platform where the one or more cloud-based service computers 122 operate, but also between the cloud computing platform 130 and the external environment where the one or more service consumer computers 112 operate. Therefore, the security gateway system 102 is programmed to establish a secure communication channel with a cloud-based service 122 or a service consumer 112. The security gateway system 102 can be configured to conform to certain transport-level security protocols and further perform application-level data encryption or decryption for any communication with any other computer system. Furthermore, the security gateway system 102 is programmed to monitor metadata in transmitted packets, payloads in the transmitted packets, and metadata in user session states for security attacks.

In some embodiments, a service consumer computer 112 is programmed to communicate with one or more cloud-based service computers 122 regarding the provided services through the security gateway system 102. More specifically, the service consumer computer 112 may be configured to transmit input data to a provided service or receive output data from the provided service. The service consumer computer 112 may comprise a computing facility with sufficient computing power in data processing, data storage, and network communication for the above-described functions. In certain embodiments, the service consumer computer 112 can comprise a desktop computer, laptop computer, tablet computer, smartphone, wearable device, etc.

The network 118 may be implemented by any medium or mechanism that provides for the exchange of data between the various elements of FIG. 1. Examples of the network 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, a service consumer computer 112 is programmed to send a request for a service, such as an HTTP message, to a cloud-based service computer 122. In other embodiments, multiple service consumer computers 112 can be programmed to send a request to a cloud-based service computer 122, or a service consumer computer 112 can be programmed to send multiple requests to multiple cloud-based service computers 122. The security gateway system 102 is programmed to initially receive the request. The security gateway system 102 is programmed to then disassemble the request in order to detect security attacks, such as a distributed denial of service (DDoS). The detection of a security attack includes complex processing that could depend on data related to other communications with the service consumer computer 112. The security gateway system 102 may comprise a lower-performance hardware portion and a higher-performance hardware portion, as further discussed below, and the processing of the request may flow between the two portions to optimize overall performance of the security gateway system 102. When a security attack is detected, the security gateway system 102 is programmed to take remedial actions. When no security attack is detected, the security gateway system 102 is programmed to then send the original request or the processing result to the cloud-based service computer 122. In response to receiving the request, the cloud-based service computer 122 is programmed to perform the requested service and send the outcome of the service to the service consumer computer 112. Similarly, the security gateway system 102 is programmed to initially receive the outcome of the service. The security gateway system 102 is programmed to then disassemble the outcome for detection of any data exfiltration, as discussed above. The security gateway system 102 is programmed to then send the original outcome or the corresponding processing result to the service consumer computer 112.

3. Example Computer Configurations and Data Paths

In general, as data is communicated from one device to another, the data may undergo various types of processing, which can be classified according to certain conceptual models. One such conceptual model is the OSI model, which includes seven layers of increasing abstraction from the physical layer to the application layer. Some of the various types of processing tend to require more computing resources, such as encryption or decryption, compression or decompression, or pattern recognition. In certain embodiments, the highest-level processing corresponding to the highest layers of the conceptual models include processing under the HTTP protocol.

In various embodiments discussed below, the security gateway system 102 comprises a lower-performance portion, such as an x86 processor or another general-purpose processor designed for sequential processing, and a higher-performance portion, such as an FPGA, application-specific integrated circuits (ASICs), or other programmable hardware inherently suitable for parallel or other high-performance processing, including high-speed or high-throughput processing. The lower-performance portion is generally used for performing lower-level tasks that do not necessarily benefit from implementation in the high-performance portion.

3.1 Offloading Processing to Higher-Performance Portion

Figure 2A:
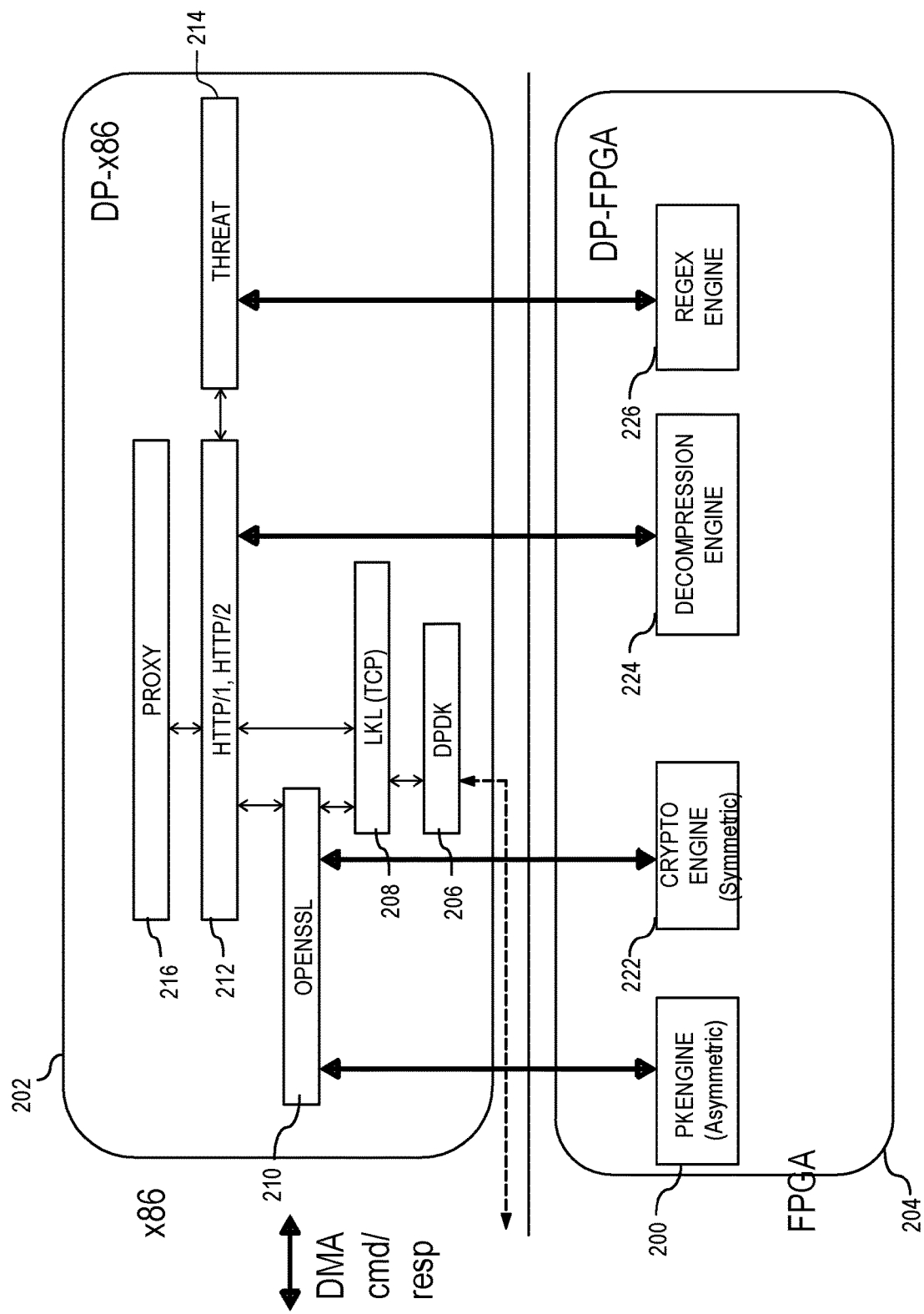
FIG. 2A illustrates an example configuration of a security gateway system for a cloud computing platform with a corresponding data path where select complex processing, including parallel processing, is offloaded from a lower-performance portion to a higher-performance portion.

FIG. 2A illustrates an example configuration of a security gateway system for a cloud computing platform with a corresponding data path where select complex processing, including parallel processing, is offloaded from a lower-performance portion to a higher-performance portion.

In some embodiments, the lower-performance portion 202 is programmed to manage the main data processing pipeline. The data processing pipeline may include a first component 206 that supports lowest-level processing, such as the processing performed by the first layer of the OSI model. The first component 206 can be implemented with the Data Plane Development Kit (DPDK). The first component 206 can be governed by the protocols corresponding to the OSI physical layer, such as the IEEE 802.3 (Ethernet) standard. The data processing pipeline may include a second component 208 configured to support lower-level processing, such as the processing performed by the next three layers of the OSI model. The second component 208 can be implemented with the Linux Kernel Library (LKL). The second component 208 can be governed by various protocols corresponding to the OSI data link layer, including the Media Access Control (MAC) layer or the Logical Link Control (LLC) sublayer, protocols corresponding to the OSI network layer, such as the Internet Protocol (IP), or protocols corresponding to the OSI transport layer, such as the Transport Layer Protocol (TCP).

The data processing pipeline may also include a third component 210 configured to support higher-level processing, such as the processing performed by the sixth layer of the OSI model. The third component 210 can be implemented using the OPENSSL library or be governed by other protocols corresponding to the OSI presentation layer. The data processing pipeline may further include a fourth component 212, a fifth component 214, and a sixth component 216 configured to support highest-level processing, such as the processing performed by the seventh layer of the OSI model. For example, the fourth component 212 can be governed by the HTTP/1 or HTTP/2 protocol, the fifth component 214 can implement security attack detection, and the sixth component 216 can implement application proxies. The security attack detection may be based on existing rules, URL filters, or run time solutions of data loss prevention (DLP). For further example, another component can implement a Web application firewall (WAF) to filter HTTP traffic to and from web applications in addition to the fifth component 214 operating in a streaming mode. In some embodiments, the higher-performance portion 204 is programmed to take over some of the processing from the lower-performance portion 202. The higher-performance portion 204 can include certain components configured to handle party authentication and secure data transmission, which often could have been included in the third component 210 discussed above. These components include a seventh component 220 configured to perform operations related to asymmetric cryptography, such as Rivest-Shamir-Adleman (RSA) exponential multiplication, elliptic curve Diffie Hellman ephemeral-elliptic curve digital signature algorithm (ECDHE-ECDSA) point multiplication, secure hash algorithm 1 (SHA1), or deterministic random bit generator (DRBG). For example, the seventh component 220 may be configured to create the Master Secret in a transport layer security (TLS) handshake. These components also include an eighth component 222 configured to perform operations related to symmetric cryptography, such as advanced encryption standard-Galois/counter mode (AES-GCM), advanced encryption standard-cipher block chaining (AES-CBC), or ChaCha (Poly). For example, the eighth component 222 can be configured to enable subsequent use of session keys to decrypt actual data. The higher-performance portion 204 can also include certain components configured to handle efficient data inspection, which often could have been included in the fourth component 212 discussed above. These components include a ninth component 224 configured to decompress the application data, such as the payload of an HTTP request compressed by gzip or other compression schemes. Furthermore, the higher-performance portion 204 can include certain components configured to find matches of specific digital signatures of malware for detection of incoming security threats or critical data exfiltration, which also could have been included in the fifth component 214 discussed above as part of the HTTP traffic inspection. These components include a tenth component 226 configured to find matches of predetermined regular expressions in the data, which may characterize a file name, a uniform resource locator (URL), or a string within the payload from one or more packets within a session, for example. In certain embodiments, any of the seventh through the tenth components 220, 222, 224, and 226 can be implemented using techniques known to someone skilled in the art.

In some embodiments, the security gateway system 102 is programmed to receive data from another device, which can reside on the same cloud computing platform or outside the cloud computing platform. The data is initially received by the lower-performance portion 202. Data processing flows through the first component 206, the second component 208, and the third component 210. The processing result is then transmitted to the higher-performance portion 204. The third component 210 can be configured to recognize whether the processing result corresponds to data for establishing a secure communication channel instead of data to be transmitted and processed within the secure communication channel. When the processing result corresponds to data for establishing a secure communication channel, data processing occurs in the seventh component 220. The processing result is then transmitted back to the lower-performance portion 202. Furthermore, since there is no additional data to process, data processing does not need to reach the fourth element 212 or succeeding components in the data processing pipeline. On the other hand, when the processing result corresponds to data to be transmitted and processed within the secure communication channel, data processing occurs in the eighth component 222. The processing result is then transmitted back to the lower-performance portion 202. Data processing then flows through the third component 210 and the fourth component 212. The processing result is then transmitted to the higher-performance portion 204, where data processing occurs in the ninth component 224. The processing result is then transmitted back to the lower-performance portion 202. The processing then flows through the fourth component 212 and the fifth component 214. The processing result is then transmitted to the higher-performance portion 204, where data processing occurs in the tenth component 226. The processing result is then transmitted back to the lower-performance portion 202. When a security attack is detected, the fifth component 214 may be programmed not to continue data processing through the fourth component 212 and the sixth component 216 and optionally start return data processing immediately from the fourth component 212. Alternatively, data processing can continue along the original path to further handle the security attack. When no security attack is detected, data processing then flows through the fifth component 214, the fourth component 212, and the sixth component 216. When return data processing is necessary as new data (instead of the original packet) needs to be transmitted to the destination, return data processing begins with the fourth component 212 and flows through at least some of the elements in the lower-performance portion 202.

In some embodiments, the interface between different components in the lower-performance portion 202 can be based on direct memory access (DMA) commands or responses related to memories implemented within the lower-performance portion 202. The interface between the lower-performance portion 202 and the higher-performance portion 204 can rely on a peripheral component interconnect express (PCIe) or other types of computer bus. As each offload to the higher-performance portion 204 requires a separate traversal of the computer bus, the example configuration discussed in this section can be optimized by at least reducing such traversal.

Figure 2B:
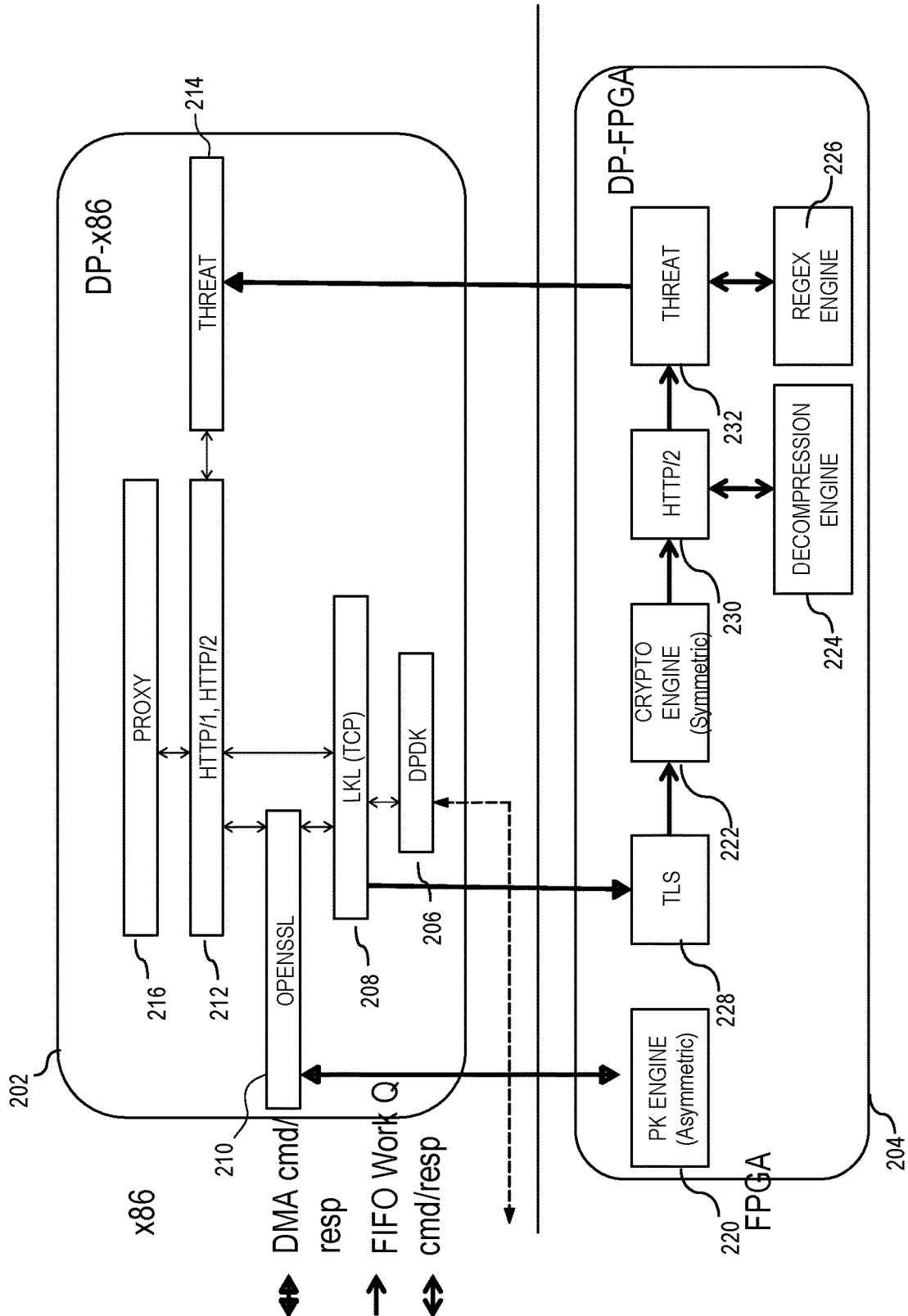
FIG. 2B illustrates an example configuration of a security gateway system for a cloud computing platform with a corresponding data path where a compute-intensive part of higher-level processing is mainly performed by a higher-performance portion instead of a lower-performance portion.

3.2 Managing Data Pipeline in Higher-Performance Portion 3.2.1 Implementing Application-Level Processing FIG. 2B illustrates an example configuration of a security gateway system for a cloud computing platform with a corresponding data path where a compute-intensive part of higher-level processing is mainly performed by a higher-performance portion instead of a lower-performance portion.

In some embodiments, the lower-performance portion 202 is programmed to handle mainly the lower-level data processing, such as most processing for the first four layers of the OSI, while the higher-performance portion 204 is programmed to handle the higher-level processing, such as the processing for the application layer of the OSI and additional compute-intensive operations that could benefit from parallelism. The lower-performance portion 202 can include similar components as illustrated in FIG. 2A. The higher-performance portion 204 can also include similar components as illustrated in FIG. 2A. The higher-performance portion 204 can include additional components to enable more advanced higher-level processing. The additional components can include an eleventh component 228 configured to handle data packaging corresponding to the transport layer of the OSI. For example, the eleventh component 228 can be configured to de-frame TLS messages and accumulate TLS records. The additional components can also include a twelfth component 230 configured to perform advanced operations corresponding to the application layer of the OSI. For example, the twelfth component 230 can be configured to implement the HTTP/2 protocol, which includes data decoding in the binary framing layer, header decompression via HPACK, association of data to a stream identifier and corresponding stream priority, breaking down the data into individual frames, pushing additional resources into the frames, and interleaving the frames in further delivery. In addition, the additional components can include a thirteenth component 232 configured to perform complex detection of incoming security threats or critical data exfiltration at the application level, or another component configured to implement an application-level firewall, such as a WAF.

In some embodiments, the security gateway system 102 is programmed to receive data from another device, which can reside on the same cloud computing platform or outside of the cloud computing platform. The data is initially received by the lower-performance portion 202. Data processing flows through the first component 206 and the second component 208. The second component 208 can be configured to recognize whether the processing result corresponds to data for establishing a secure communication channel instead of data to be transmitted and processed within the secure communication channel. When the processing result corresponds to data for establishing a secure communication channel, data processing can continue to flow through the third component 210, the seventh component 220, and back to the third component 210, as illustrated in FIG. 2A. Furthermore, since there is no additional data to process, data processing does not need to reach the fourth element 212 or succeeding components in the data processing pipeline. On the other hand, when the processing result corresponds to data to be transmitted and processed within the secure communication channel, the processing result is transmitted to the higher-performance portion 204. Data processing then flows through the eleventh component 228, the eighth component 222, the twelfth component 230, the ninth component 224, the twelfth component 230, the thirteenth component 232, the tenth component 226, and the thirteenth component 232. At this point, the processing result is transmitted to the lower-performance portion 202, and data processing continues from the fifth component 216, as illustrated in FIG. 2A.

In some embodiments, the interface between different components in the higher-performance portion 204 can be based on operations related to FIFO queues or other memory structures implemented within the higher-performance portion 204.

3.2.2 Implementing Anomaly Detection

Figure 2C:
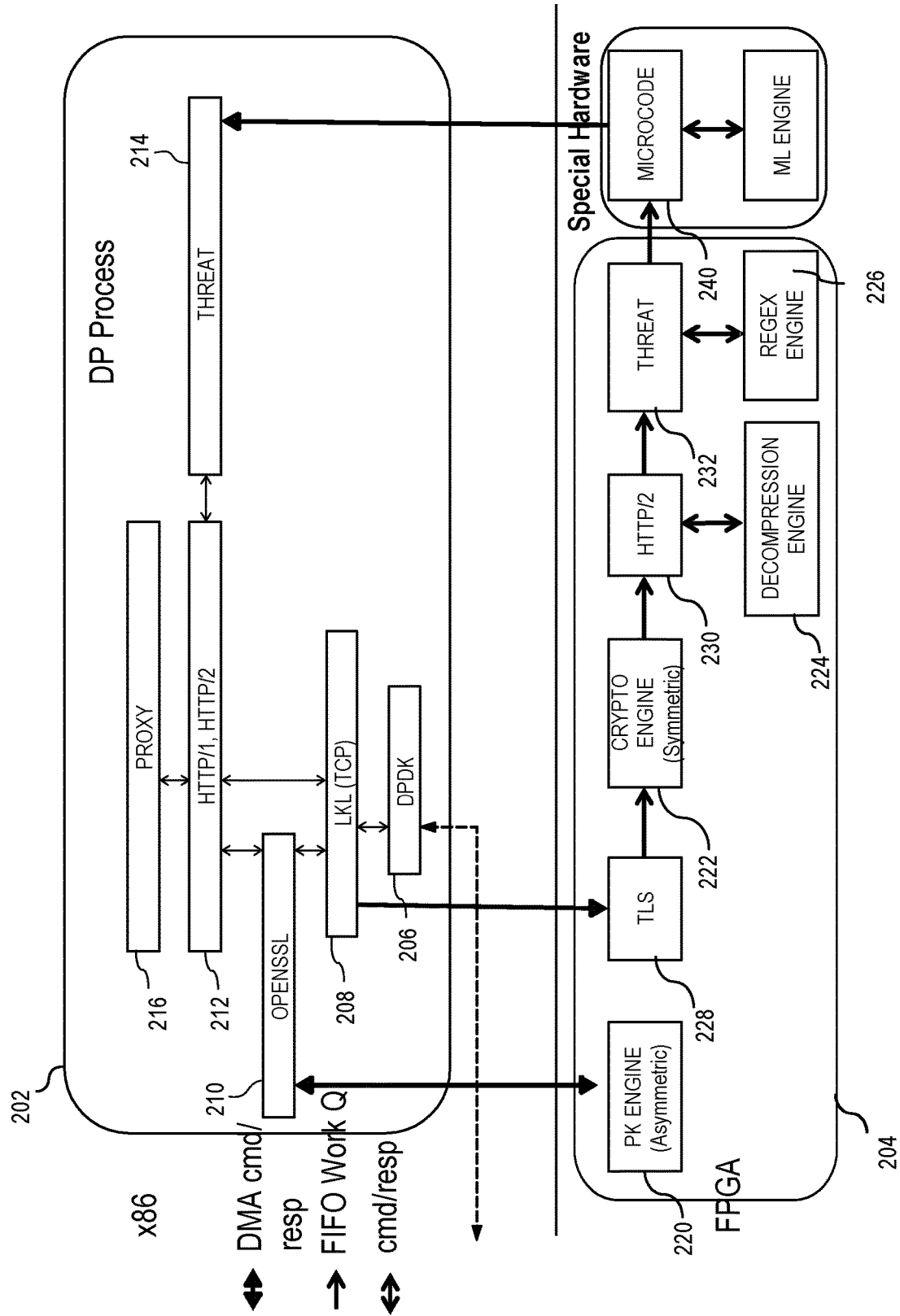
FIG. 2C illustrates another example configuration of a security gateway system for a cloud computing platform with a corresponding data path where higher-level processing, including complex threat detection, is mainly performed by a higher-performance portion instead of a lower-performance portion.

FIG. 2C illustrates another example configuration of a security gateway system for a cloud computing platform with a corresponding data path where higher-level processing, including complex security attack detection, is mainly performed by a higher-performance portion instead of a lower-performance portion.

In some embodiments, the higher-performance portion 204 includes a fourteenth component 240 for complex security attack detection. In addition to finding matches of predetermined regular expressions in the data, the fourteenth component 240 is configured to work with signatures of malicious hosts that depend on various aspects of the communications between different computer systems (or corresponding computer applications) through the security gateway system. Such various aspects may include the states of communication associated with the computer systems, the data being communicated by the computer systems, or statistics, metrics, or patterns related to the states of communication or the communicated data. For communication under the HTTP protocol, for example, the various aspects may include the states of separate HTTP flows (streams of bidirectional flows of bytes within an established connection) or HTTP sessions in the form of HTTP status codes, the headers or payloads of HTTP messages, application IDs derived from HTTP sessions information, HTTP policy language (reflecting a set of rules required by a cloud-based service, for example), or the numbers of active HTTP flows (indicating how often messages are sent) or incomplete HTTP flows (indicating how long it takes to process the messages) during a specific period of time. Some of these various aspects may have been recorded by one or more preceding components in the data pipeline for further analysis by the fourteenth component 240.

More specifically, some countries might be associated with higher alerts given the historically high volumes of security attacks originating from those countries. Certain security attacks may be known to take place according to a specific schedule, such as every three minutes between the hours of 2:00 to 4:00 AM in Pacific Standard Time. A security attack may correspond to an operation that is immediately preceded by one or more queries of different APIs of a destination computer system for planning purposes (e.g., how to uncover desired data). For example, the APIs provided by Web services that conform to the Representation State Transfer (REST) architecture might be queried via certain HTTP methods in one or more sessions. Likewise, a security attack may correspond to an operation that is immediately followed by one or more transfers of data (e.g. desired data that have been uncovered) from the destination computer system to specific data repositories for storage or publication purposes. In addition, certain security attacks may be known to hide their signatures by using varying compression or encryption algorithms. Many security attacks would target identifiable confidential, personal information, such as social security numbers, home addresses, or telephone numbers. Therefore, in some embodiments, the fourteenth component 240 can be specifically configured to consider the various aspects of the communications between different computer systems through the security gateway system 102 that include the geographic origin of a communication by a computer system, the time when a communication was initiated by a computer system, the nature of the operations involved in the immediately preceding or succeeding communications (by the same computer system, any computer system, the same computer program, or any computer program, etc.), the gap between the present communication and the immediately preceding or succeeding communication, or the size, the compression status, or the content of the present communication. Furthermore, some of the computer systems may already have security attack detection mechanisms in place, such as additional patterns or other rules embodied in their HTTP policy. In some embodiments, the fourteenth component 240 can be configured to also incorporate those security attack detection mechanisms, by parsing the language of the HTTP policy, for example.

For example, the fourteenth component 240 can be configured to flag an anomaly when the following detection conditions are all satisfied:

a. An HTTP request came from an IP address associated with a black-listed country;
b. The HTTP request was received during a particular time of the day;
c. The HTTP request was preceded by an HTTP request querying all the APIs of a destination computer system;
d. The gap between the HTTP request and the immediately preceding or following HTTP request was no less than 5 seconds;
e. The HTTP request was followed by an HTTP request including a put operation to a data repository offering file hosting service;
f. The size of the payload of the HTTP request is non-zero;
g. The payload of the HTTP request is compressed;
h. The payload of the HTTP request contains user signatures with a security number, a home-address, or a telephone number.

For example, such a set of detection conditions in combination with other predetermined regular expressions can be used to identify an occurrence of an attack that includes an HTTP get request with a PHP session ID and a user agent which can be matched to specific signatures, an application of a compression/encryption method, and a peer-to-peer data transfer under the server message block (SMB) protocol.

In some embodiments, the fourteenth component 240 is configured to analyze all communication data, including communications that comprise security attacks, and further identify specific patterns or signatures of such security attacks using machine learning techniques known to someone skilled in the art, such as neural networks, regression methods, or decision forests. At least part of such application of machine learning techniques can be implemented by an FPGA, other specific hardware, or specific instruction sets especially suitable for implementing such operation of machine learning techniques. For example, specific processors can be used to execute microcode that controls the operation of a finite state machine based on the set of detection conditions, as discussed above.

4. Example Processes

Figure 3:
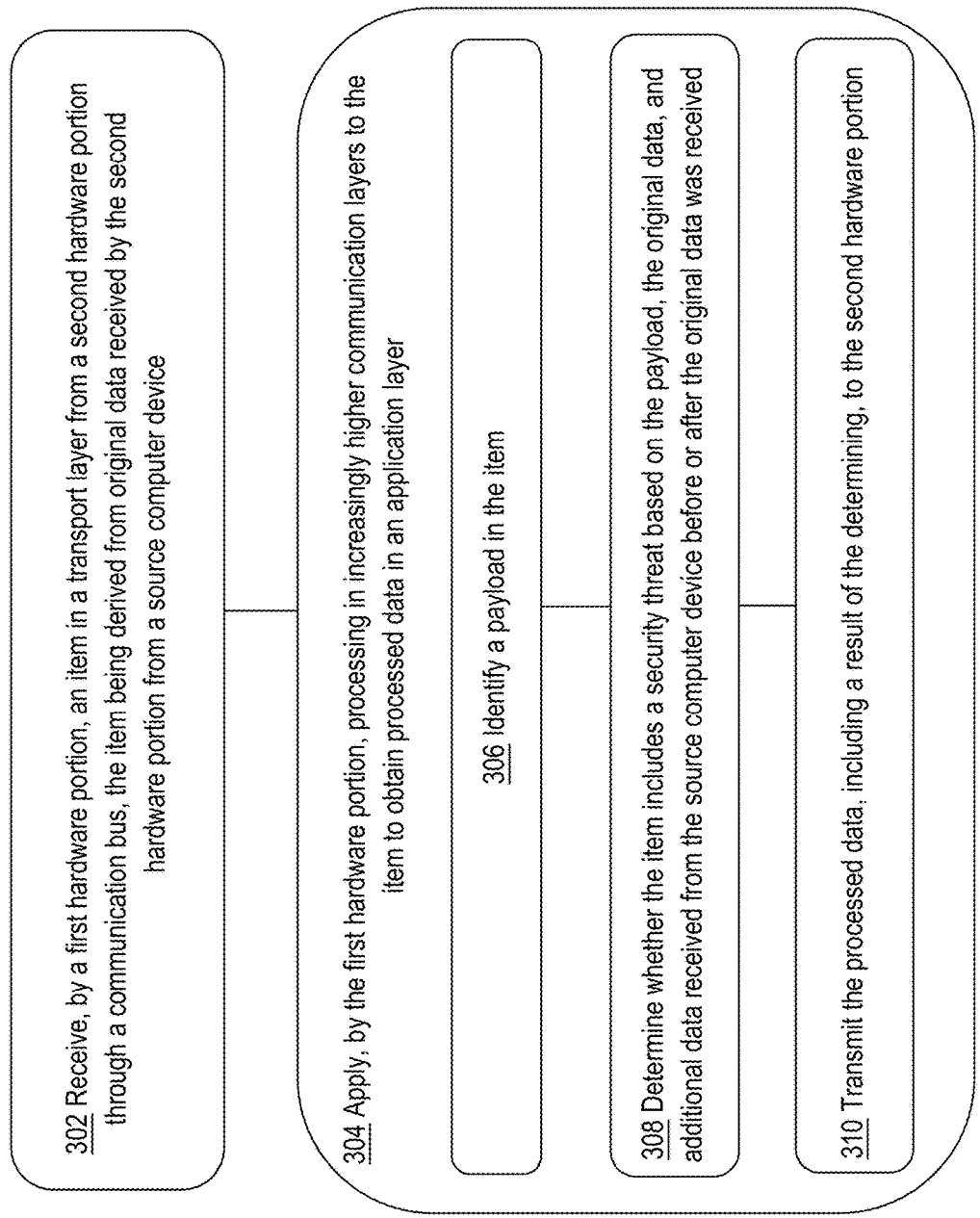
FIG. 3 illustrates an example process of implementing a computer security gateway via deep content inspection.

FIG. 3 illustrates an example process of implementing a computer security gateway via deep content inspection. FIG. 3 is shown in simplified, schematic format for purposes of illustrating a clear example and other embodiments may include more, fewer, or different elements connected in various manners. FIG. 3 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In some embodiments, the security gateway system 102 for a cloud computing platform comprises a first, higher-performance hardware portion, such as a commodity FPGA or one or more special-purpose processors, and a second, lower-performance hardware portion, such as one or more general-purpose processors. The second hardware portion is programmed to intercept a packet from a source computer system to a destination computer system, one of them being a service consumer computer and the other being a cloud-based service computer. Initially, a packet may be part of the handshake process through which the source computer system and the destination process establish the protocols of their communication and secure the communication channel. The second hardware portion is programmed to process the packet but offload the computation-intensive process of exchanging keys via asymmetric cryptography to the first hardware portion. Subsequently, a packet may contain actual data, such as input data to the service provided by the cloud-based service computer or output data from the service. The second hardware portion is programmed to then apply lower-level processing to the packet. Under the OSI model, for example, such lower-level processing may include processing up to the transport layer. The second hardware portion is programmed to then transmit the processing result to the first hardware portion for higher-level processing.

In some embodiments, in step 302, the first hardware portion is programmed to then receive an item in a transport layer from the second hardware portion through a communication bus. In step 304, the first hardware portion is programmed to apply higher-level processing to the item or a derivative thereof as follows. Under the OSI model, such higher-level processing may include processing up to the application layer. More specifically, the higher-level processing can start with transport-level processing, such as de-framing a TLS record from a TCP byte stream. The higher-level processing can comprise decrypting data, such as the TLS record, via symmetric cryptography. In certain embodiments, the higher-level processing can include separate decompression of headers and payloads, such as HTTP/2 headers and HTTP data. The higher-level processing can comprise further application-level processing, such as processing under HTTP/2.

In some embodiments, in step 306, as an initial part of the application-level processing, the first hardware portion is programmed to identify a payload in the item received from the first hardware portion. In step 308, the first hardware portion is programmed to determine whether the item forms a security attack based on the payload, the original data, or additional data received from the source computer device before or after the original data was received, including data received from multiple user sessions. More specifically, the first hardware portion can be programmed to determine whether the payload matches specific regular expression-based signatures, contains an authorization to share personal data, has a specific size, is compressed, or satisfies other criteria regarding the payload. The first hardware portion can be programmed to also evaluate the IP address of the source computer system, the time when the item or the original packet was received, or other metadata associated with the payload. In addition, the first hardware portion can be programmed to analyze data related to additional packets received from the source computer system or corresponding items. More specifically, the first hardware portion may be configured to flag a security anomaly when the payloads in the immediately preceding packets or corresponding items correspond to an exploration of all the APIs of the destination computer system or when the payloads in the immediately succeeding packets or corresponding items correspond to one or more transfers or uploads of obtained data to a data repository. When the number or frequency of the requests received from the source computer system that are destined for the destination computer system exceeds a first threshold or when the amount of time required to process these requests exceeds a second threshold, a conclusion of a security anomaly can also be made. For example, under HTTP/2, the first hardware portion can be configured to monitor the number of active HTTP flows or the number of incomplete HTTP flows corresponding to requests or messages received from the source computer system and destined for one or more destination computer systems during a period of time. In step 310, the first hardware portion is programmed to transmit a result of all the higher-level processing, including a result of determining whether the item includes or forms a security attack, to the second hardware portion.

In some embodiments, the second hardware portion is programmed to analyze the result of determining whether the item forms a security attack. In response to the occurrence of a security attack, the second hardware portion can take a remedial action, such as sending a notification to the destination computer system without forwarding the packet or simply discarding the packet. In response to an absence of a security attack, the second hardware portion is programmed to then perform further high-level processing, such as the processing performed by a proxy server. The second hardware portion is then programmed to send the original packet to the destination computer system or subject current processing result to increasingly lower levels of processing for transmission to the destination computer system.

5. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
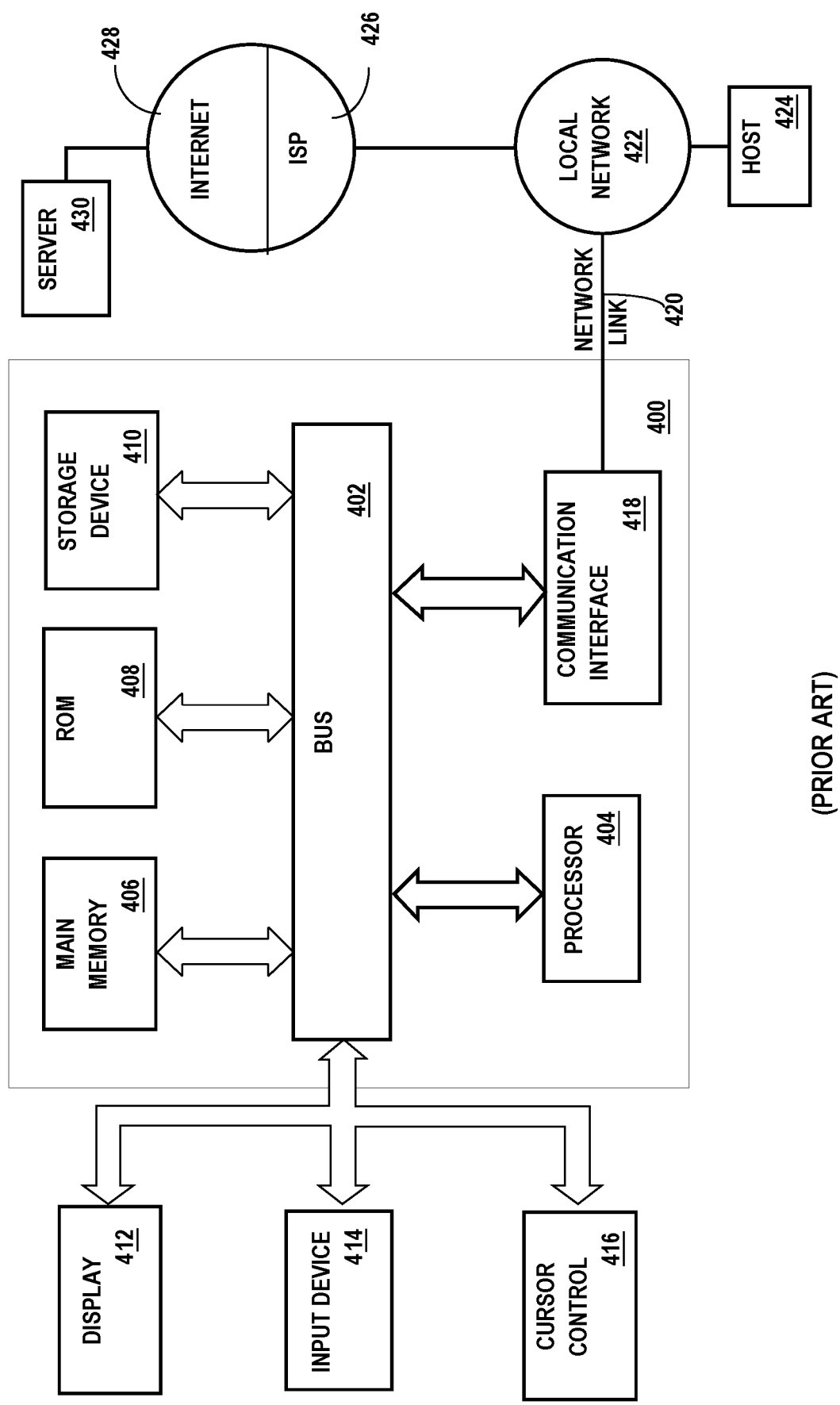
FIG. 4 is a block diagram that illustrates a computer system upon which an embodiment of the invention may be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM, and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi wireless networking technology, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to be read by computer system 400. For instance, a receiver such as a radio frequency antenna or an infrared detector can receive the data carried in a wireless or optical signal and appropriate circuitry can provide the data to I/O subsystem 402, for example, by placing the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication network, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, inter-network or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as the DOCKER computer program that performs operating-system-level virtualization or the KUBERNETES container orchestration system for automating application deployment, scaling, and management. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

6.0 Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method of implementing a computer security gateway via deep content inspection, comprising:

receiving, by a first hardware portion comprising programmable hardware, an item in a transport layer from a second hardware portion through a communication bus, wherein the item is derived from original data received by the second hardware portion from a source computer device; and applying, by the first hardware portion, processing in a presentation layer, a session layer, and an application layer to the item to obtain processed data in the application layer, wherein the applying comprises:
identifying a payload in the item;
determining whether the item includes a security attack based on the payload, the original data, and additional data received from the source computer device before or after the original data was received; and
transmitting the processed data, including a result of the determining, to the second hardware portion.

2. The computer-implemented method of claim 1, wherein the applying further comprises:
decrypting the item or a derivative of the item to generate decrypted data;
decompressing the decrypted data or a derivative of the decrypted data to generate decompressed data; and
identifying the payload from the decompressed data.

3. The computer-implemented method of claim 1, wherein:
the original data is destined for a destination computer device, and
the determining further comprises evaluating whether additional data received before the original data is related to a query of an API provided by the destination computer device or whether additional data received after the original data is related to a transfer of data obtained from the destination computer device to a data repository.

4. The computer-implemented method of claim 1, wherein the second hardware portion comprises a general-purpose processor.

5. The computer-implemented method of claim 1,
wherein the item leads to an HTTP request associated with a first session, and
wherein the additional data includes an HTTP request associated with a second session different from the first session.

6. The computer-implemented method of claim 1, further comprising:
receiving, from the second hardware portion, a first item in a higher communication layer than the transport layer,
wherein the first item is derived from first original data received by the second hardware portion from the source computer device, and the first original data includes handshake information for further communication;
decoding the first item to generate decoded data; and
transmitting the decoded data to the second hardware portion.

7. The computer-implemented method of claim 1,
wherein the original data is destined for a destination computer device,
wherein the first hardware portion and the second hardware portion cooperate to form a security gateway system for a cloud computing platform, and
wherein one of the source computer device and the destination computer device resides inside the cloud computing platform, while the other of the source computer device and the destination computer device resides outside the cloud computing platform.

8. One or more integrated circuits for implementing a network firewall for a cloud computing platform, comprising:
special-purpose hardware;
a memory storing instructions which when executed cause the special-purpose hardware configured to perform:
receiving an item in a transport layer from a second hardware portion through a communication bus,
wherein the item is derived from original data received by the second hardware portion from a source computer device; and
applying processing in a presentation layer, a session layer, and an application layer to the item to obtain processed data in an application layer, wherein the applying comprises:
identifying a payload in the item;
determining whether the item includes a security attack based on the payload, the original data, and additional data received from the source computer device before or after the original data was received; and
transmitting the processed data, including a result of the determining, to the second hardware portion.

9. The one or more integrated circuits of claim 8, wherein the special-purpose hardware comprises a commodity FPGA.

10. The one or more integrated circuits of claim 8, wherein the special-purpose hardware comprises a commodity processor configured to execute microcode, which when executed performs at least a portion of the determining.

11. The one or more integrated circuits of claim 8, further comprising the second hardware portion, the second hardware portion comprising a general-purpose processor.

12. The one or more integrated circuits of claim 11, wherein the second hardware portion is configured to further perform:
transforming the processed data as a proxy server to generate proxy data;
applying processing in increasingly lower layers to the proxy data to generate final data in the lowest level; and
transmitting the final data to a destination computer device.

13. The one or more integrated circuits of claim 11,
wherein the original data is destined for a destination computer device,
wherein one of the source computer device and the destination computer device resides inside the cloud computing platform, and
wherein the other of the source computer device and the destination computer device resides outside the cloud computing platform.

14. The one or more integrated circuits of claim 8,
wherein the original data is destined for a destination computer device, and
wherein the determining further comprises evaluating whether additional data received before the original data is related to a query of an API provided by the destination computer device or whether additional data received after the original data is related to a transfer of data obtained from the destination computer device to a data repository.

15. The one or more integrated circuits of claim 8, wherein the special-purpose hardware is configured to further perform:
receiving, from the second hardware portion, a first item in a higher communication layer than the transport layer,
wherein the first item is derived from first original data received by the second hardware portion from the source computer device, and the first original data includes handshake information for further communication;

decoding the first item to generate decoded data; and transmitting the decoded data to second hardware portion.

16. The one or more integrated circuits of claim 8, wherein the instructions is executable by a virtual machine hosted on the special-purpose hardware.

* * * * *